US012327996B2

(12) United States Patent
Santiago et al.

(10) Patent No.: US 12,327,996 B2
(45) Date of Patent: Jun. 10, 2025

(54) POWER CONTROLLER

(71) Applicant: NXP B.V., Eindhoven (NL)

(72) Inventors: Erik Santiago, La Tour du Crieu (FR); Antoine Fabien Dubois, Austin, TX (US); Pierre Philippe Calmes, Toulouse (FR)

(73) Assignee: NXP B.V., Eindhoven (NL)

( * ) Notice: Subject to any disclaimer, the term of this patent is extended or adjusted under 35 U.S.C. 154(b) by 177 days.

(21) Appl. No.: 18/350,003

(22) Filed: Jul. 11, 2023

(65) Prior Publication Data

US 2024/0022065 A1    Jan. 18, 2024

(30) Foreign Application Priority Data

Jul. 18, 2022 (EP) .................................... 22306066

(51) Int. Cl.
H02H 7/00 (2006.01)
H02H 1/00 (2006.01)
H02H 7/20 (2006.01)

(52) U.S. Cl.
CPC ............ *H02H 7/20* (2013.01); *H02H 1/0007* (2013.01)

(58) Field of Classification Search
None
See application file for complete search history.

(56) References Cited

U.S. PATENT DOCUMENTS 6,425,512 B2 * 7/2002 Hill ...................... D21G 9/0063
226/170
7,834,575 B2  11/2010 Hauenstein et al.
(Continued)

FOREIGN PATENT DOCUMENTS

JP    2016206842 A    12/2016

OTHER PUBLICATIONS

Analog Devices, "30 A Isolated SiC Gate Driver with Slew Rate Control and SPI", ADuM4177 Data Sheet, (no month available) 2020.

(Continued)

*Primary Examiner* — Stephen W Jackson

(57) ABSTRACT

One example discloses a power controller [400] configured to modulate a load current sent to a load, including: a first chip [406] including a set of higher-power circuits configured to directly modulate the load current sent to the load [410]; a second chip [404] electrically coupled to the first chip and including a set of lower-power circuits; wherein the set of higher-power circuits are electrically isolated from the set of lower-power circuits; a power control path [212] distributed between the first chip and the second chip, and configured to modulate the load current sent to the load; a diagnostics path [218] distributed between the first chip and the second chip, and configured to monitor the higher-power circuits in the first chip and the lower-power circuits in the second chip for a set of fault conditions; wherein a portion of the diagnostics path in the second chip includes a plausibility circuit [420] configured to compare a load current commanded by a first portion of the power control path in the second chip to the load current sent to the load by a second portion of the power control path in the first chip; and wherein the plausibility circuit is configured to transmit a safe-state request [426] if the load current sent to the load is not equivalent to the load current commanded; and wherein the safe-state request is transmitted in parallel to the load current commanded by the first portion of the power control path in the second chip.

20 Claims, 9 Drawing Sheets

(56) References Cited

U.S. PATENT DOCUMENTS

| | | |
|---|---|---|
| 8,451,626 B2 | 5/2013 | Coleman |
| 9,726,712 B2 | 8/2017 | Wu |
| 10,351,002 B2 | 7/2019 | Saha et al. |
| 12,113,351 B2 * | 10/2024 | Leavitt .................... H02H 3/20 |
| 2011/0266890 A1 * | 11/2011 | Lorenz .................... H02H 7/20 |
| | | 307/125 |
| 2015/0077884 A1 * | 3/2015 | Behrends .............. H10F 77/955 |
| | | 361/5 |
| 2020/0117160 A1 | 4/2020 | Uemura et al. |
| 2020/0328660 A1 * | 10/2020 | Guo ..................... B60L 3/0084 |
| 2021/0331591 A1 | 10/2021 | Santiago et al. |

OTHER PUBLICATIONS

Texas Instruments, "UCC5870-Q1 30-A Isolated IGBT/SiC MOSFET Gate Driver with Advanced Protection Features for Automotive Applications", UCC5870-Q1 Data Sheet, Sep. 2021.

\* cited by examiner

POWER CONTROLLER

CROSS-REFERENCE TO RELATED APPLICATIONS

This application claims the priority under 35 U.S.C. § 119 of European Patent application no. 22306066.6, filed on 18 Jul. 2022, the contents of which are incorporated by reference herein.

The present specification relates to systems, methods, apparatuses, devices, articles of manufacture and instructions for power control.

SUMMARY

According to an example embodiment, a power controller configured to modulate a load current sent to a load, comprising: a first chip including a set of higher-power circuits configured to directly modulate the load current sent to the load; a second chip electrically coupled to the first chip and including a set of lower-power circuits; wherein the set of higher-power circuits are electrically isolated from the set of lower-power circuits; a power control path distributed between the first chip and the second chip, and configured to modulate the load current sent to the load; a diagnostics path distributed between the first chip and the second chip, and configured to monitor the higher-power circuits in the first chip and the lower-power circuits in the second chip for a set of fault conditions; wherein a portion of the diagnostics path in the second chip includes a plausibility circuit configured to compare a load current commanded by a first portion of the power control path in the second chip to the load current sent to the load by a second portion of the power control path in the first chip; and wherein the plausibility circuit is configured to transmit a safe-state request if the load current sent to the load is not equivalent to the load current commanded; and wherein the safe-state request is transmitted in parallel to the load current commanded by the first portion of the power control path in the second chip.

In another example embodiment, the safe-state request is a shutdown request.

In another example embodiment, the safe-state request is transmitted directly to at least one of the set of higher-power circuits in the second portion of the power control path that directly controls the load current sent to the load; and the safe-state request is not transmitted through the first portion of the power control path in the second chip.

In another example embodiment, further comprising a power switch coupled to the power control path and configured to be coupled to the load; wherein the safe-state request is transmitted directly to a high-voltage logic switch in the set of higher-power circuits in the second portion of the power control path that directly controls the load current sent to the load by the power switch.

In another example embodiment, further comprising a safety management path distributed between the first chip and the second chip; wherein a first portion of the safety management path in the first chip includes a first safety manager circuit configured to monitor the higher-power circuits for a fault condition; and wherein a second portion of the safety management path in the second chip includes a second safety manager circuit configured to monitor the lower-power circuits for a fault condition.

In another example embodiment, in response to the fault condition, the second safety manager circuit is configured to request that the first safety manager circuit reduce the load current sent to the load.

In another example embodiment, in response to the fault condition, the second safety manager circuit is configured to send a shutdown request to the first safety circuit.

In another example embodiment, in response to the fault condition, the first safety manager circuit is configured to directly reduce the load current sent to the load.

In another example embodiment, in response to the fault condition, the first safety manager circuit is configured to send an escalation request to the second safety circuit; and the first safety manager circuit is configured to execute a first command to place the power controller into the safe-state.

In another example embodiment, in response to the escalation request, the second safety circuit sends a second command through the power control path requesting that the current modulation signals command that the load current sent to the load be reduced.

In another example embodiment, the safety management path is in parallel with the power control path.

In another example embodiment, the safety management path is in parallel with both the power control path and the diagnostics path.

In another example embodiment, the safety management path is electrically isolated from both the power control path and the diagnostics path.

In another example embodiment, further comprising a high-current transistor configured to be coupled to and send the load current to the load; wherein the set of higher-power circuits include a drive circuit coupled to control a gate of the high-current transistor.

In another example embodiment, the load is an electric motor.

In another example embodiment, the load is at least one of: an electric converter and an onboard charger.

In another example embodiment, the set of fault conditions include a load current shutdown request from a microcontroller unit (MCU) in the set of lower-power circuits.

In another example embodiment, the set of fault conditions include an implausible power control command detected.

In another example embodiment, the set of fault conditions include either an undervoltage or an overvoltage condition.

In another example embodiment, the set of fault conditions include a communications fault detected.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
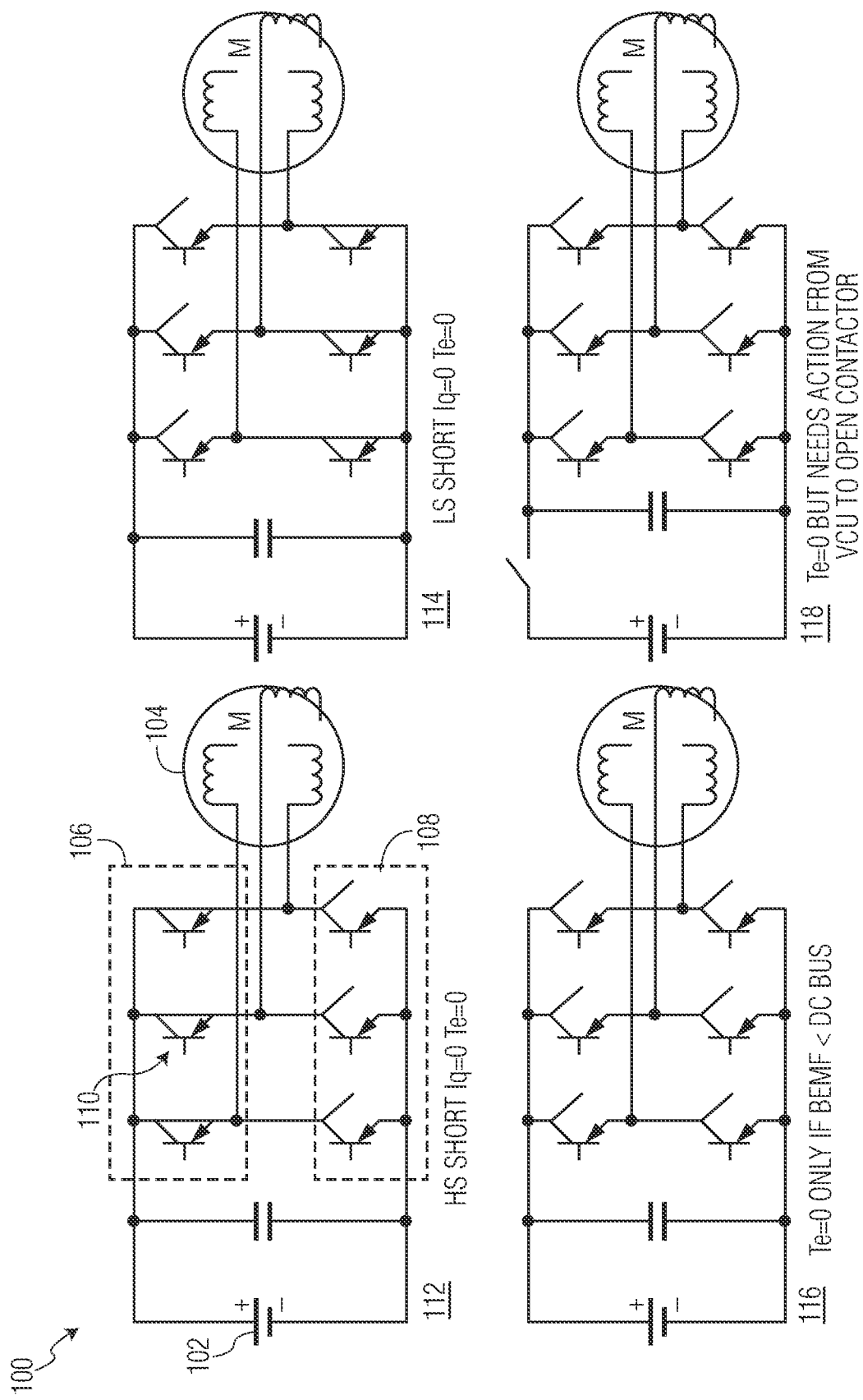
FIG. 1 represents set of example safe-states for a power control system.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the scope of the appended claims are covered as well.

DETAILED DESCRIPTION

Functional Safety is needed for and being added to many safety critical electrical systems. Such safety critical electrical systems depend upon circuits failing in a predictable manner into a safe-state such that injury to a user or the overall electrical system is avoided.

For example, in an electric vehicle an electric propulsion motor shall not brake or be blocked (braking torque) for any DC-AC inverter faults. If this happened it may lead to an hazard (loss of vehicle control). To insure this safety goal the DC-AC inverter need to detect any fault and apply a safe-state (e.g. safely shutdown) on the motor (e.g. apply a motor release permitting free-wheeling).

FIG. 1 represents set of example safe-states 100 for a power control system. Each of the safe-states 100 show an electrical system with a DC power source 102, an AC electric motor 104, a high-side gate driver array 106 coupled to three-phase inputs of the electric motor 104, a low-side gate driver array 108 also coupled to three-phase inputs of the electric motor 104, and a set of power transistor gates 110.

In a first safe-state 112 the 3 phases of the motor shall be shorted to the HS (High-Side) at motor high speed. In a second safe-state 114 the 3 phases of the motor shall be shorted to the LS (Low-Side) at motor high speed. In a third safe-state 116 the 3 phase of the motor shall be all open at motor low speed so that motor torque (Te)=0 if a BEMF (Back EMF) is less than the DC bus voltage from the DC power source 102. In a fourth safe-state 118 the 3 phase of the motor shall be open at motor low speed so that motor torque (Te)=0 and the DC bus voltage is disconnected.

The power control system's inverter uses six gate drivers 110 to drive the six power transistors in order to drive the motor 104 or to apply one of the above mention safe-states. So the six gate drivers 110 need to be configured for safety shutdown independently to be able to apply the proper safe-state on the motor 104 depending on location of the fault and vehicle context like the motor speed. To continue to drive the motor 104 in case of gate driver 110 fault, the gate driver 110 shutdown shall isolate the fault and be reconfigured so that the motor 104 can operate in at least 2 phases.

Figure 2:
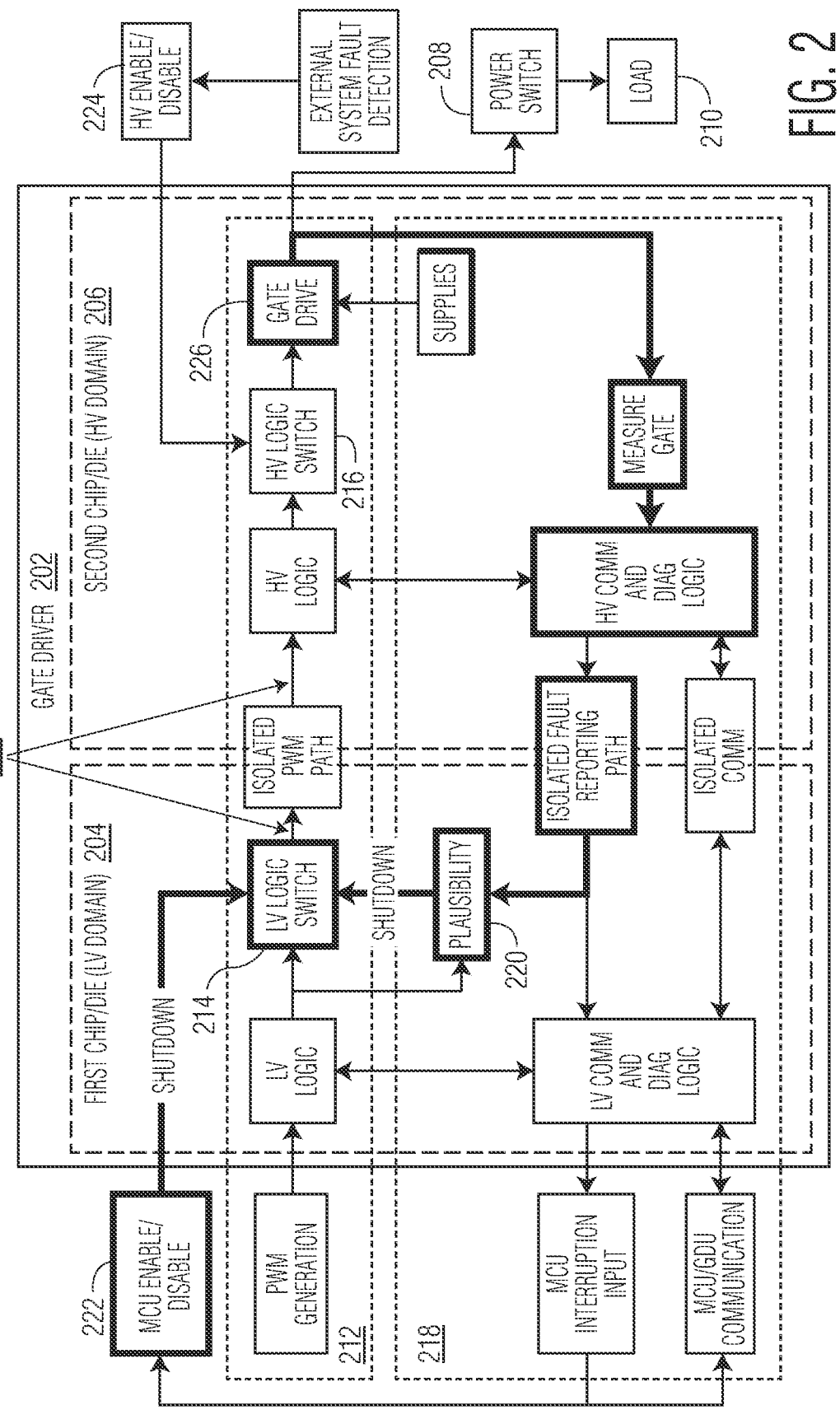
FIG. 2 represents a first example power control system.

FIG. 2 represents a first example power control system 200. The power control system 200 includes a gate driver 202 (i.e. a power controller). The gate driver 202 is divided into a first chip/die 204 (LV domain) and a second chip/die 206 (HV domain). The system 200 includes a power switch 208 coupled to provide a load current to a load 210.

The load 210 is controlled by a power control path 212 having a LV Logic switch 214 and a HV Logic switch 216. A diagnostics path 218 tracks operation of the gate driver 202 to ensure a level of functional safety, and includes a plausibility circuit 220. Various shutdown signals can be sent from either the plausibility circuit 220 or an MCU Enable/Disable 222 to the LV Logic switch 214 and from a HV Enable/Disable 224 to the HV Logic switch 216 as shown.

The plausibility circuit 220 implements a diagnostic test comparing a load current request from a PWM (Pulse Width Modulation) generation circuit to an actual load current commanded by a gate drive 226. The plausibility circuit 220 detects failure of the within the power control path 212. When any failures/faults are detected, the gate driver 202 is shutdown (i.e. safe-state entry) and the fault reported to an MCU (not shown). Thus the plausibility circuit 220 determines if there is any inconsistency between a "commanded state" and an "actual state" of the power controller 202.

In this design, safe-state entry is controlled by 2 pins (the MCU's Enable/Disable 222 shutdown path pin and the plausibility circuit 220 shutdown path pin. Both of these paths/pins route through the power control path's 212 isolated PWM path, HV Logic, and HV Logic switch 216 which includes various a single point of failure possibilities. For example, if the signal is stuck high, we cannot turn off the gate driver. If the signal is stuck High, Low or Open before HV logic Switch, we cannot configure the Power switch to Close, Open or Tri-state for smarter system safety reaction like system reconfiguration on the fly (scalability and availability weakness).

Thus this example 200 HV isolated gate driver 202 if applied to an electric vehicle (EV) lack safety integration, dependency and scalability of the power traction system which may result in hazards for the user while the vehicle is moving at high speed, if the gate driver 202 fails. Similar hazards situations are relevant also for OBC (On-Board Charging), electric converters (i.e. AC-DC or DC-DC), and BMS (Battery Management Systems). What Is important for functional safety is to reduce any single point faults made by common cause failure or cascading failure. For example, if control path and safety path are in the same path it is a common cause failure and single point fault. An improvement to functional safety would reduce a number of common cause failures and/or single point faults, thereby insuring or increasing an isolation and independence between the control path and the safety reaction path.

Figure 3:
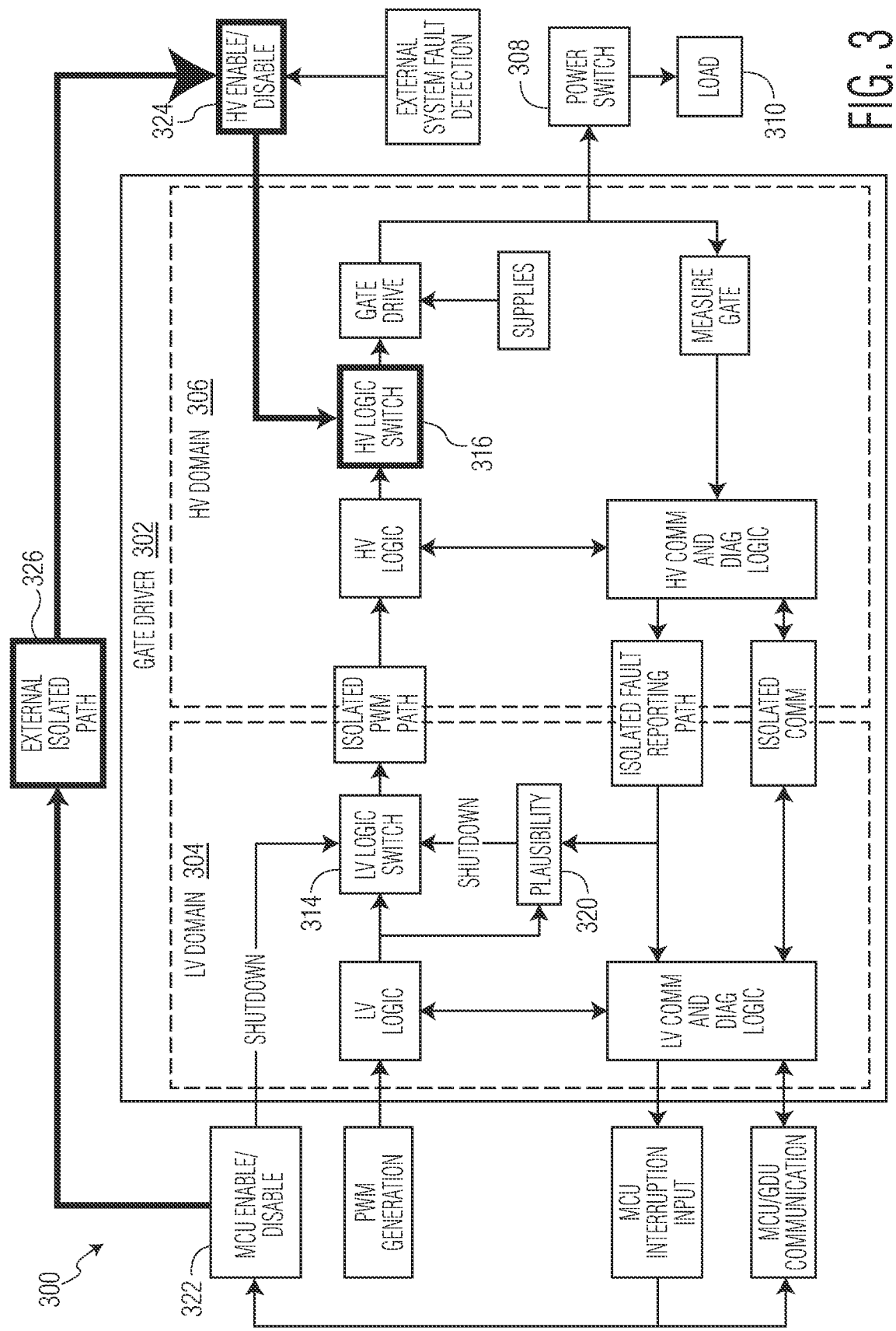
FIG. 3 represents a second example power control system.

FIG. 3 represents a second example power control system 300. The power control system 300 includes a gate driver 302 (i.e. a power controller). The gate driver 302 is divided into a first chip (e.g. die) 304 (LV domain) and a second chip (e.g. die) 306 (HV domain). The system 300 includes a power switch 308 coupled to provide a load current to a load 310.

The load 310 is, similar to FIG. 2, controlled by a power control path having a LV Logic switch 314 and a HV Logic switch 316. A diagnostics path tracks operation of the gate driver 302 to ensure a level of functional safety, and includes a plausibility circuit 320. As before in FIG. 2, various shutdown signals can be sent from either the plausibility circuit 320 or an MCU Enable/Disable 322 to the LV Logic switch 314 and from a HV Enable/Disable 324 to the HV Logic switch 316 as shown.

However, to avoid the single point/node failures of the FIG. 2 design, an external isolated path 326 is added. While this solves one problem (i.e. single point failures) this design creates other problems. For example, this design is limited in terms of safety scalability and integration and also it is not cheap since in the application shown in FIG. 1 for example, six external isolated paths 326 would have to be added. For a DC-AC inverter system or an OBC application, up to fourteen external isolated paths 326 would have to be added. The external isolated path 326 would also need discrete parts (R, C, . . . ) and specific power supplies compatible with the LV side and then the HV side. The external isolated path's 326 real estate, bill of materials and costs would thus be very high for a system with a lot of MOSFET power switches 308 to drive.

Now discussed are various example embodiments for avoiding single point/node failures in power controllers, such as gate drivers, by providing for either an embedded backup functional safety path (i.e. FIG. 4 and FIG. 5) or an embedded safety management path (i.e. FIG. 6, FIG. 7, FIG. 8 and FIG. 9). Either of these approaches place a load into a safe-state without a need for external circuitry and is thus much less expensive to implement.

These example embodiments also provide for an independent and isolated safety management path that also supports BIST (Built-In Self Test) functionalities. These example embodiments ensure that gate driver shutdown become latent and allow isolation of any gate driver power control path fault thereby increasing system availability using system reconfiguration on the fly to achieve fail operational systems. Latent faults checks on the shutdown path can also be implemented using BIST. The direct connection of the gate driver's HV and LV domains reduces a circuit reaction time required to place the power control system into a safe-state without needing the main MCU.

Figure 4:
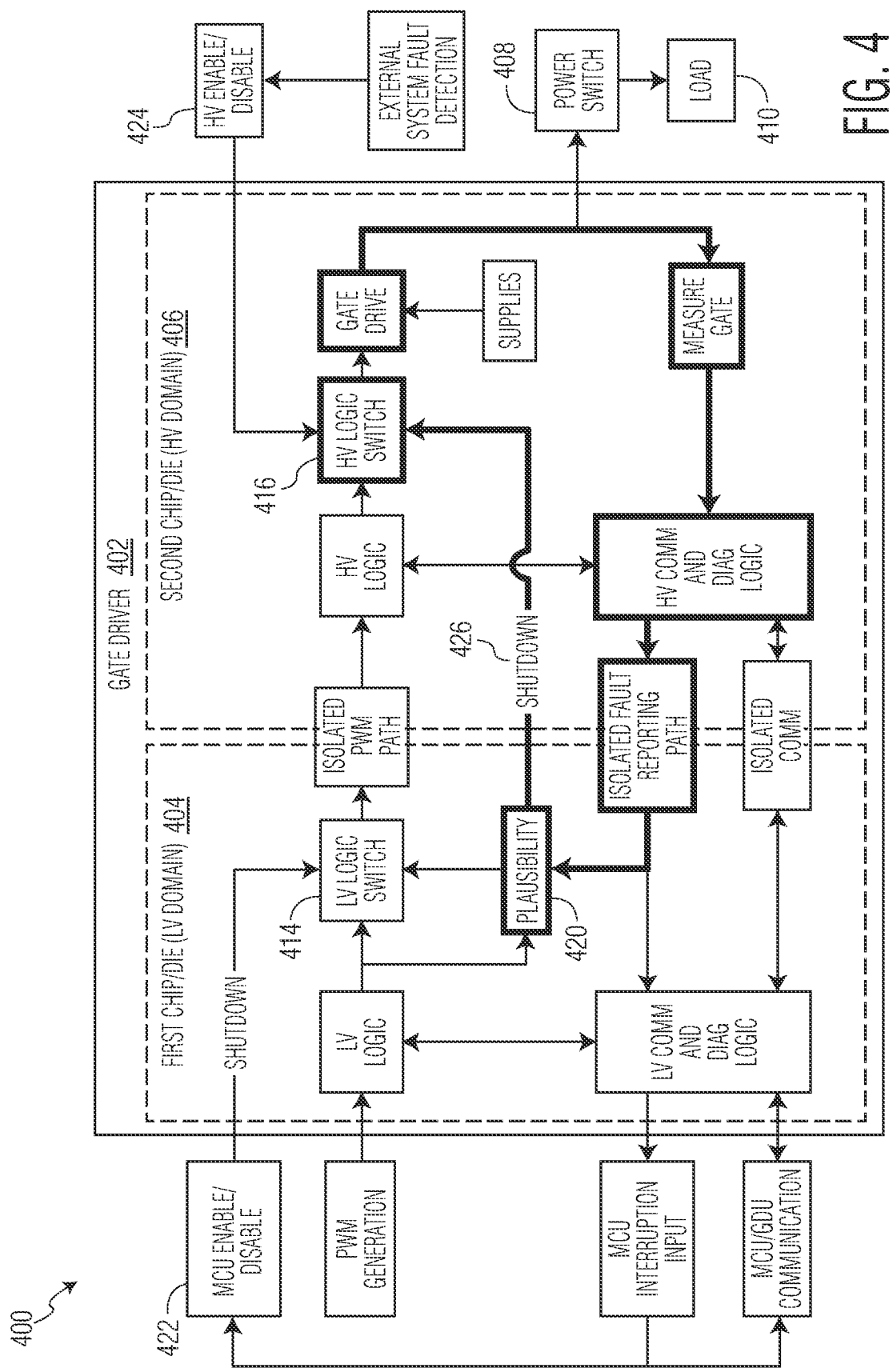
FIG. 4 represents a third example power control system.

FIG. 4 represents a third example power control system 400. The power control system 400 includes a gate driver 402 (i.e. a power controller). The gate driver 402 is divided into a first chip/die 404 (LV domain) and a second chip/die 406 (HV domain). The system 400 includes a power switch 408 coupled to provide a load current to a load 410.

The load 410 is, similar to FIG. 2, controlled by a power control path having a LV Logic switch 414 and a HV Logic switch 416. A diagnostics path tracks operation of the gate driver 402 to ensure a level of functional safety, and includes a plausibility circuit 420. Various shutdown signals can be sent from either an MCU Enable/Disable 422 to the LV Logic switch 414 or from a HV Enable/Disable 424 to the HV Logic switch 416 as shown. Unlike FIG. 2, the plausibility circuit 420 does not send it's safe-state (e.g. shutdown) command to the LV Logic switch 414.

Instead, to avoid the single point/node failures of the FIG. 2 design, a direct LV domain to HV domain safe-state path 426 is added from the plausibility circuit 420. The safe-state (e.g. shut down) path is no longer being routed through the first part of the power control path (i.e. the LV Logic switch 414) anymore. The MCU Enable/Disable 422 still requests a safe-state through the power control path (i.e. the LV Logic switch 414 and related path circuits) and thus provides a backup safe-state path.

Figure 5:
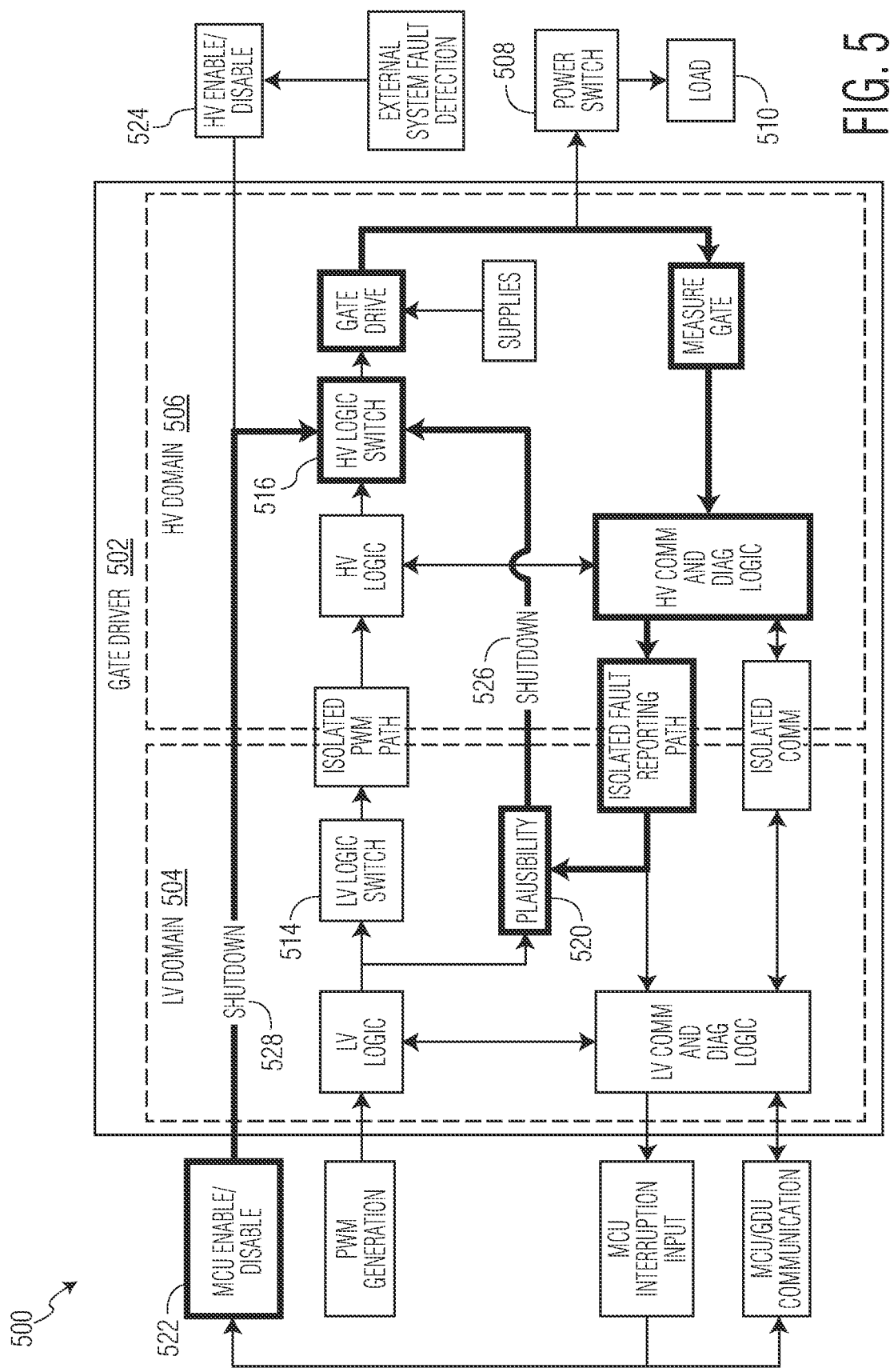
FIG. 5 represents a fourth example power control system.

FIG. 5 represents a fourth example power control system 500. The power control system 500 includes a gate driver 502 (i.e. a power controller). The gate driver 502 is divided into a first chip/die 504 (LV domain) and a second chip/die 506 (HV domain). The system 500 includes a power switch 508 coupled to provide a load current to a load 510.

The load 510 is, similar to FIG. 2, controlled by a power control path having a LV Logic switch 514 and a HV Logic switch 516. A diagnostics path tracks operation of the gate driver 502 to ensure a level of functional safety, and includes a plausibility circuit 520. A shutdown signal can still be sent from a HV Enable/Disable 524 to the HV Logic switch 516 as shown. Unlike FIG. 2, neither the plausibility circuit 520 nor an MCU Enable/Disable 522 sends their safe-state (e.g. shutdown) commands to the LV Logic switch 514.

Instead, to avoid the single point/node failures of the FIG. 2 design, a first direct LV domain to HV domain safe-state path 526 is added from the plausibility circuit 520, and a second direct LV to HV domain safe-state path 528 is added from the MCU Enable/Disable 522. Thus the safe-state (e.g. shut down) paths are no longer being routed through the first part of the power control path (i.e. the LV Logic switch 514) anymore.

Now to be discussed in FIG. 6, FIG. 7, FIG. 8 and FIG. 9 are gate drivers (i.e. power controllers) having embedded safety management paths. The safety management paths include an LV domain safety manager circuit and a HV domain safety manager circuit that communicate with each other over paths that are isolated/independent from the power control path (e.g. hosting the PWM signals).

The LV and HV safety manager circuits provide an external independent and intelligent controller configured to choose and apply a proper safe-state configuration in response to a fault condition, depending on the application (e.g. for an electric vehicle), operational context (e.g. avoiding electrical motor high braking torque) and location of any faults in the gate driver circuits. As a result safe-state scalability, reconfiguration and reaction time can be optimized for various applications, such as in an electric car's power traction system, OBC(On-Board Charging), DC-DC conversion, and other applications.

The safety manager circuits also allow safety architecture of gate driver with independencies (functional versus safety) and (Safety LV versus Safety HV); allow safety manager circuits to receive faults and trigger direct shutdown on HV side or escalate the fault to MCU; allow easy link and fault interaction between the domain HV and LV; allow scalability for safe-state and shutdown configuration base on fault events from HV or LV domain; and allow faster safety reaction without MCU decision request (depending on system wished reaction configuration).

Figure 6:
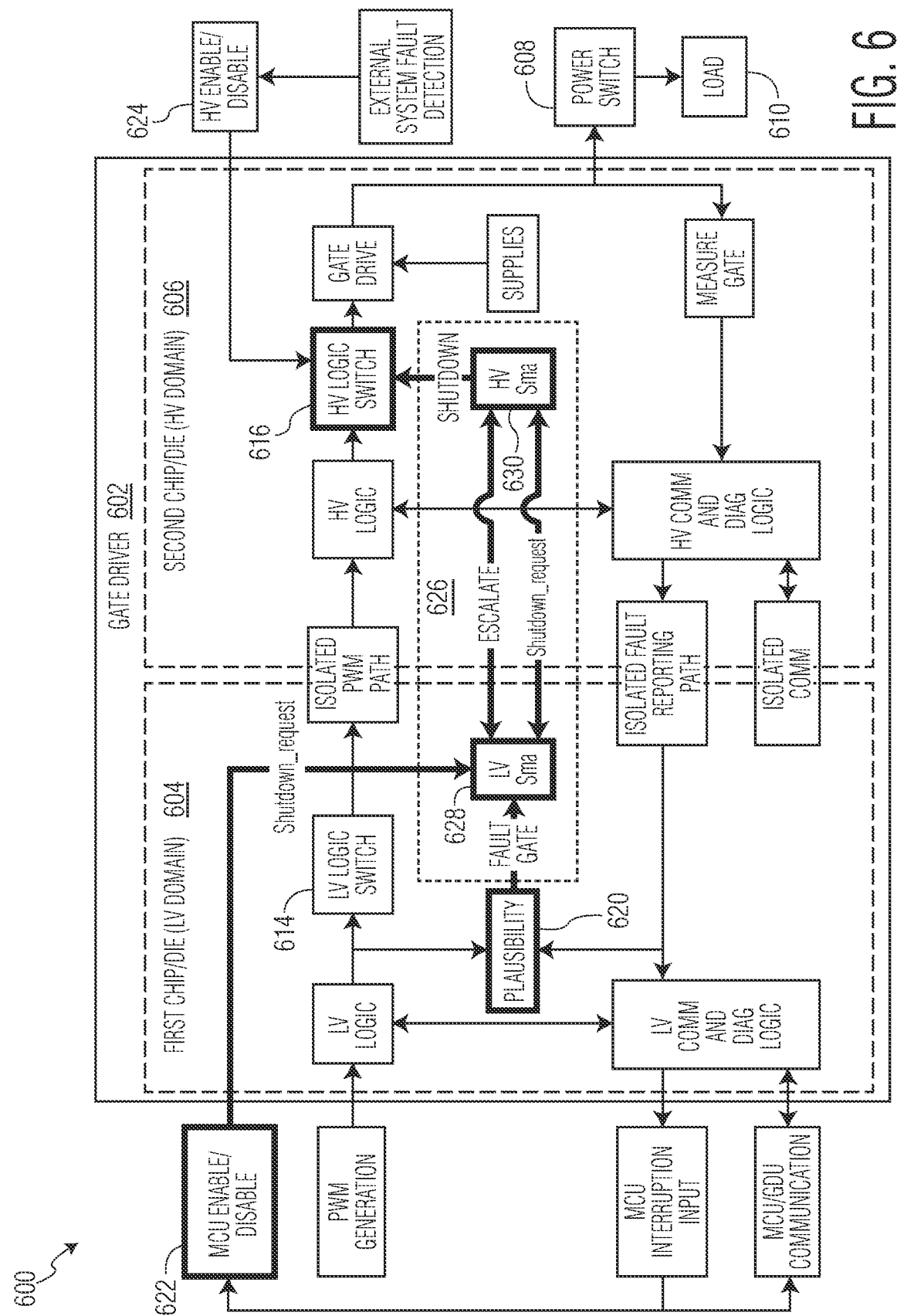
FIG. 6 represents a fifth example power control system.

FIG. 6 represents a fifth example power control system 600. The power control system 600 includes a gate driver 602 (i.e. a power controller). The gate driver 602 is divided into a first chip/die 604 (LV domain) and a second chip/die 606 (HV domain). The system 600 includes a power switch 608 coupled to provide a load current to a load 610.

The load 610 is, similar to FIG. 2, controlled by a power control path having a LV Logic switch 614 and a HV Logic switch 616. A diagnostics path tracks operation of the gate driver 602 to ensure a level of functional safety, and includes a plausibility circuit 620.

The power control system 600 further includes a safety management path 626 that itself includes a LV safety manager circuit 628 and a HV safety manager circuit 630. The two safety manager circuits 628, 630 communicate using a shutdown request path and an escalate path.

The shutdown request path permits either of the safety manager circuits 628, 630 to request that the other safety manager circuit execute a command to place the power control system 600 into a safe-state.

The escalate path permits either of the safety manager circuits 628, 630 to not only execute a first command to place the power control system 600 into a safe-state, but to further escalate and request that the other safety manager circuit also execute a second command to place the power control system 600 into a safe-state.

The two safety manager circuits 628, 630 receive signals from various other circuits in the power control system 600 (e.g. from plausibility circuit 620 and MCU Enable/Disable 622) to identify any fault conditions.

Figure 7:
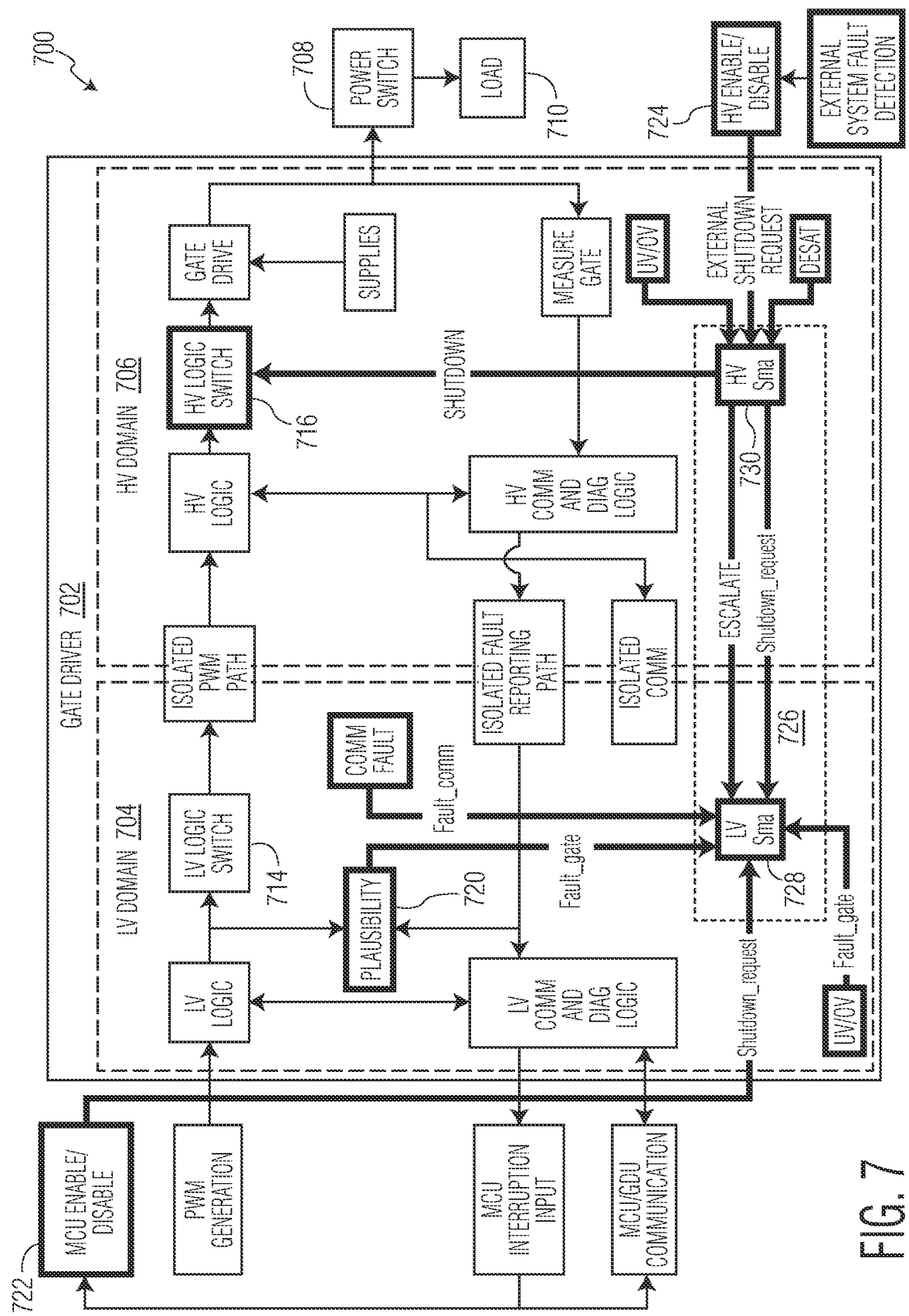
FIG. 7 represents a sixth example power control system.

FIG. 7 represents a sixth example power control system. The power control system 700 includes a gate driver 702 (i.e. a power controller). The gate driver 702 is divided into a first chip/die 704 (LV domain) and a second chip/die 706

(HV domain). The system 700 includes a power switch 708 coupled to provide a load current to a load 710.

The load 710 is, similar to FIG. 2, controlled by a power control path having a LV Logic switch 714 and a HV Logic switch 716. A diagnostics path tracks operation of the gate driver 702 to ensure a level of functional safety, and includes a plausibility circuit 720.

Similar to FIG. 6, the power control system 700 further includes a safety management path 726 that itself includes a LV safety manager circuit 728 and a HV safety manager circuit 730. The two safety manager circuits 728, 730 similarly communicate using a shutdown request path and an escalate path, as discussed in FIG. 6

In this FIG. 7; however, the two safety manager circuits 728, 730 are shown to receive additional signals from various other circuits in the power control system 700 to identify any fault conditions. These additional signals include at least: a LV domain undervoltage/overvoltage (UV/OV) fault, a communications fault, a HV domain undervoltage/overvoltage (UV/OV) fault, a HV Enable/Disable 724, and a DSAT fault.

Figure 8:
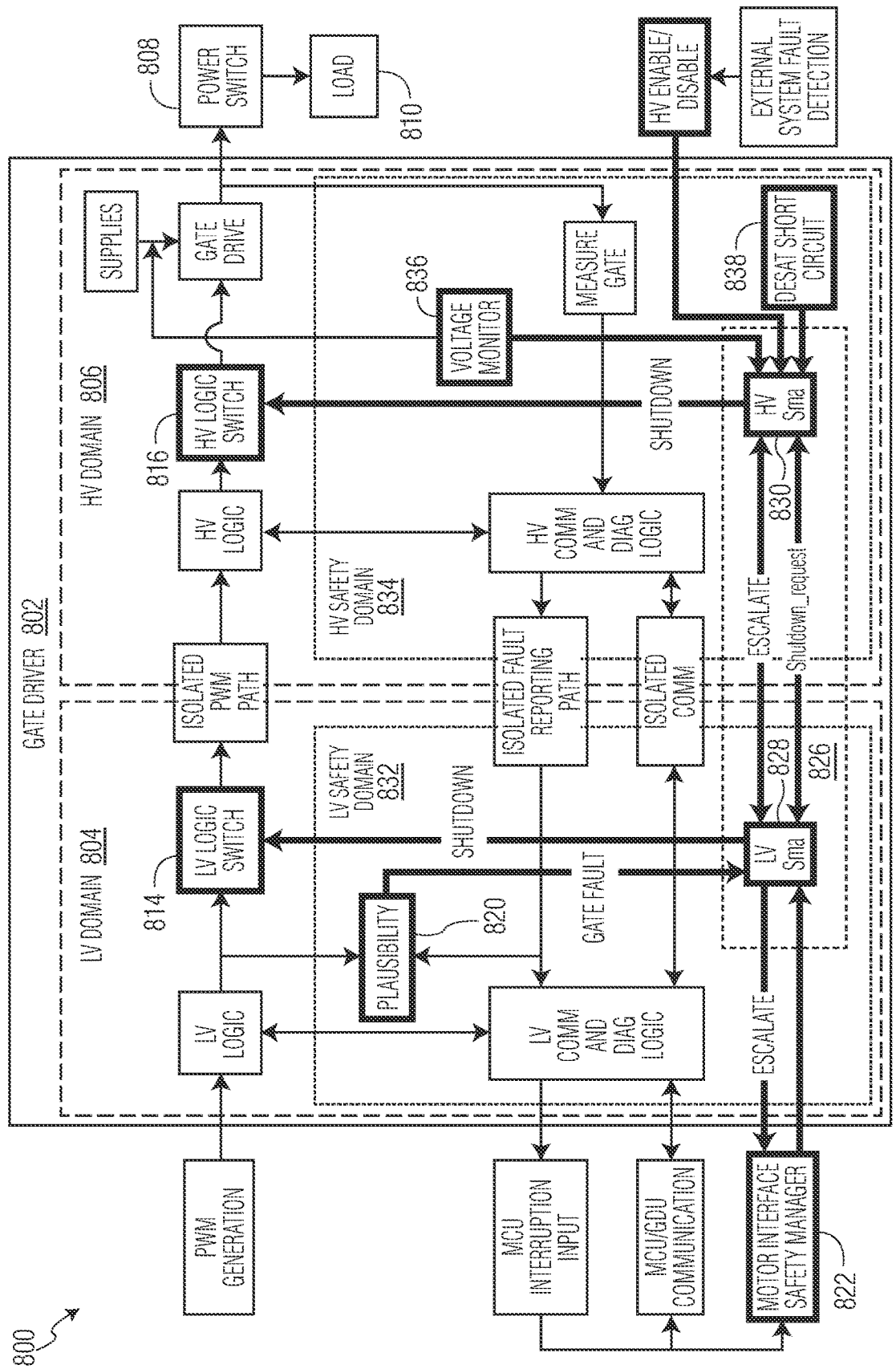
FIG. 8 represents a seventh example power control system.

FIG. 8 represents a seventh example power control system 800. The power control system 800 includes a gate driver 802 (i.e. a power controller). The gate driver 802 is divided into a first chip/die 804 (LV domain) and a second chip/die 806 (HV domain). The system 800 includes a power switch 808 coupled to provide a load current to a load 810.

The load 810 is, similar to FIG. 2, controlled by a power control path having a LV Logic switch 814 and a HV Logic switch 816. A diagnostics path tracks operation of the gate driver 802 to ensure a level of functional safety, and includes a plausibility circuit 820.

Similar to FIGS. 6 and 7, the power control system 800 further includes a safety management path 826 that itself includes a LV safety manager circuit 828 and a HV safety manager circuit 830. The two safety manager circuits 828, 830 similarly communicate using a shutdown request path and an escalate path, as discussed in FIG. 6

In this FIG. 8; however, a LV Safety domain 832 and a HV Safety domain 834 are defined.

Also different from FIGS. 6 and 7, a motor interface safety manager 822 replaces the prior Figure's MCU Enable/Disable 622, 722 signal. Additionally a voltage monitor 836 and a DESAT short circuit fault 838 are added fault conditions that the HV safety manager circuit 830 receives.

Figure 9:
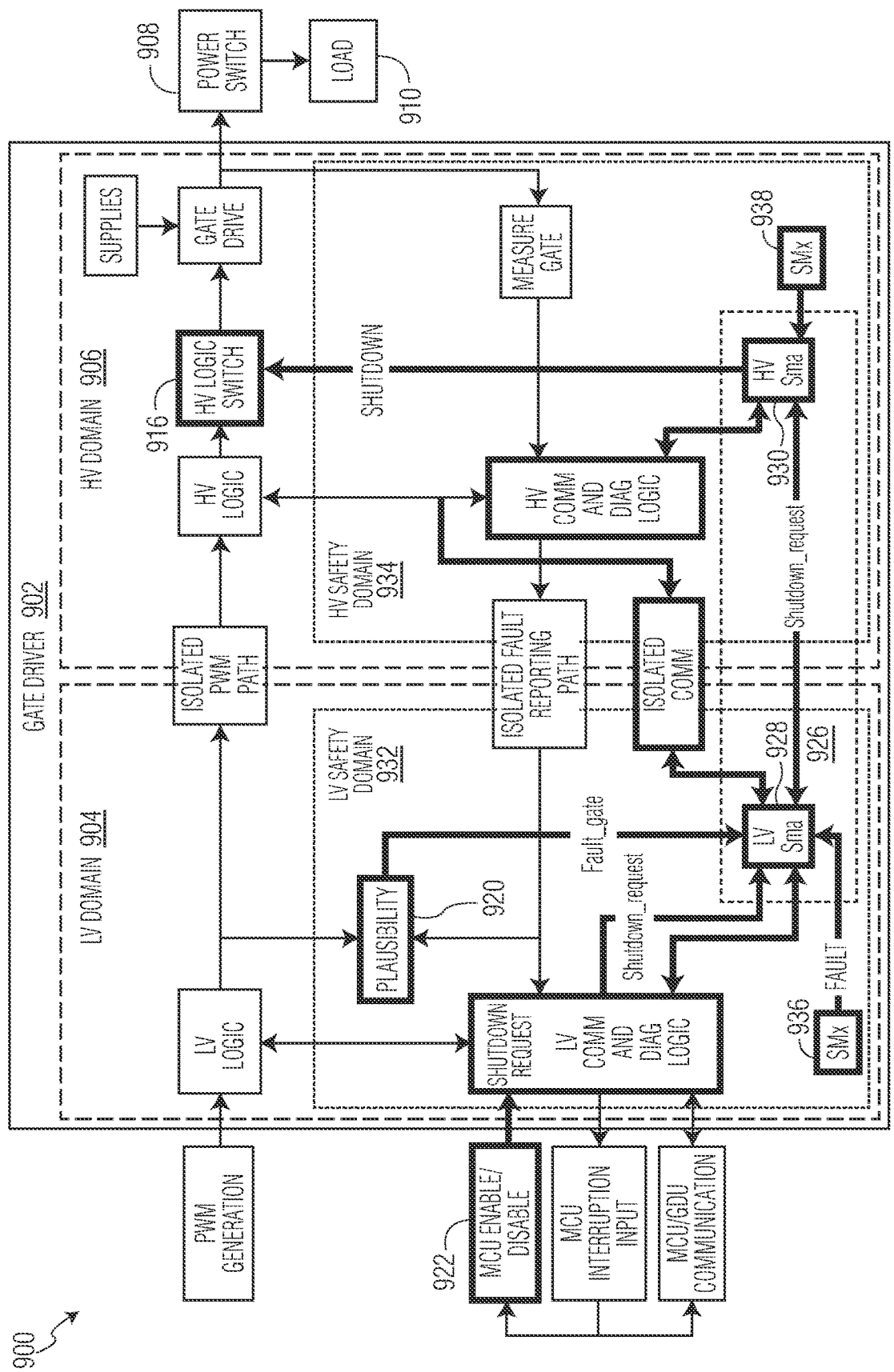
FIG. 9 represents an eighth example power control system.

FIG. 9 represents an eighth example power control system 900. This example system 900 reuses more of the existing data IN-OUT isolated paths from the diagnostics path, since they are already isolated/independent from the power control path (i.e. PWM path), but are similarly used to apply safe-state (e.g. shutdown) commands from the LV Safety domain 932 directly to the HV Logic switch 916 in the HV Safety domain 934.

Otherwise, and similar to FIGS. 6, 7 and 8, the power control system 900 includes a gate driver 902 (i.e. a power controller). The gate driver 902 is divided into a first chip/die 904 (LV domain) and a second chip/die 906 (HV domain). The system 900 includes a power switch 908 coupled to provide a load current to a load 910.

The load 910 is, similar to FIG. 2, controlled by a power control path having a HV Logic switch 916. A LV Logic switch and a HV Enable/Disable circuit that appeared in FIGS. 6, 7 and 8 however have been deleted. A diagnostics path tracks operation of the gate driver 902 to ensure a level of functional safety, and includes a plausibility circuit 920.

Similar to FIGS. 6, 7 and 8, the power control system 900 further includes a safety management path 926 that itself includes a LV safety manager circuit 928 and a HV safety manager circuit 930. The two safety manager circuits 928, 930 similarly communicate using a shutdown request path and an escalate path, as discussed in FIG. 6

In various alternate example embodiments of the systems discussed in FIGS. 2-9, one or more of the circuits shown external to either the first chip/die (LV domain) or the second chip/die (HV domain) may be included in either the first chip/die (LV domain) or the second chip/die (HV domain). For example in some example embodiments, the power switch and the HV Enable/Disable circuit may be included in the second chip/die (HV domain). Similarly, the MCU Enable/Disable may be included in the first chip/die (LV domain). Other elements within either the first chip/die (LV domain) or the second chip/die (HV domain) may in some applications be moved outside of those LV and HV domains, or moved between the LV and HV domains. Additionally, various other fault conditions beyond those listed in this specification may also cause the power controller to be placed into a safe-state.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

The invention claimed is:

1. A power controller configured to modulate a load current sent to a load, comprising:
   a first chip including a set of higher-power circuits configured to directly modulate the load current sent to the load;
   a second chip electrically coupled to the first chip and including a set of lower-power circuits;
   wherein the set of higher-power circuits are electrically isolated from the set of lower-power circuits;
   a power control path distributed between the first chip and the second chip, and configured to modulate the load current sent to the load;
   a diagnostics path distributed between the first chip and the second chip, and configured to monitor the higher-power circuits in the first chip and the lower-power circuits in the second chip for a set of fault conditions;
   wherein a portion of the diagnostics path in the second chip includes a plausibility circuit configured to compare a load current commanded by a first portion of the power control path in the second chip to the load current sent to the load by a second portion of the power control path in the first chip; and
   wherein the plausibility circuit is configured to transmit a safe-state request if the load current sent to the load is not equivalent to the load current commanded; and
   wherein the safe-state request is transmitted in parallel to the load current commanded by the first portion of the power control path in the second chip.

2. The controller of claim 1:
wherein the safe-state request is a shutdown request.

3. The controller of claim 1:
wherein the safe-state request is transmitted directly to at least one of the set of higher-power circuits in the second portion of the power control path that directly controls the load current sent to the load; and
wherein the safe-state request is not transmitted through the first portion of the power control path in the second chip.

4. The controller of claim 1:
further comprising a power switch coupled to the power control path and configured to be coupled to the load;
wherein the safe-state request is transmitted directly to a high-voltage logic switch in the set of higher-power circuits in the second portion of the power control path that directly controls the load current sent to the load by the power switch.

5. The controller of claim 1, further comprising:
a safety management path distributed between the first chip and the second chip;
wherein a first portion of the safety management path in the first chip includes a first safety manager circuit configured to monitor the higher-power circuits for a fault condition; and
wherein a second portion of the safety management path in the second chip includes a second safety manager circuit configured to monitor the lower-power circuits for a fault condition.

6. The controller of claim 5:
wherein in response to the fault condition, the second safety manager circuit is configured to request that the first safety manager circuit reduce the load current sent to the load.

7. The controller of claim 5:
wherein in response to the fault condition, the second safety manager circuit is configured to send a shutdown request to the first safety circuit.

8. The controller of claim 5:
wherein in response to the fault condition, the first safety manager circuit is configured to directly reduce the load current sent to the load.

9. The controller of claim 5:
wherein in response to the fault condition, the first safety manager circuit is configured to send an escalation request to the second safety circuit; and
wherein the first safety manager circuit is configured to execute a first command to place the power controller into the safe-state.

10. The controller of claim 9:
wherein in response to the escalation request, the second safety circuit sends a second command through the power control path requesting that the current modulation signals command that the load current sent to the load be reduced.

11. The controller of claim 5:
wherein the safety management path is in parallel with the power control path.

12. The controller of claim 5:
wherein the safety management path is in parallel with both the power control path and the diagnostics path.

13. The controller of claim 5:
wherein the safety management path is electrically isolated from both the power control path and the diagnostics path.

14. The controller of claim 1:
further comprising a high-current transistor configured to be coupled to and send the load current to the load;
wherein the set of higher-power circuits include a drive circuit coupled to control a gate of the high-current transistor.

15. The controller of claim 1:
wherein the load is at least one of: an electric motor, an electric converter and an onboard charger.

16. The controller of claim 6:
wherein in response to the fault condition, the second safety manager circuit is configured to send a shutdown request to the first safety circuit.

17. The controller of claim 5:
further comprising a high-current transistor configured to be coupled to and send the load current to the load;
wherein the set of higher-power circuits include a drive circuit coupled to control a gate of the high-current transistor.

18. The controller of claim 5:
wherein the load is at least one of: an electric motor, an electric converter and an onboard charger.

19. The controller of claim 5:
wherein the safe-state request is transmitted directly to at least one of the set of higher-power circuits in the second portion of the power control path that directly controls the load current sent to the load; and
wherein the safe-state request is not transmitted through the first portion of the power control path in the second chip.

20. The controller of claim 5:
further comprising a power switch coupled to the power control path and configured to be coupled to the load;
wherein the safe-state request is transmitted directly to a high-voltage logic switch in the set of higher-power circuits in the second portion of the power control path that directly controls the load current sent to the load by the power switch.

\* \* \* \* \*